United States Patent [19]
Johndrow et al.

[11] 3,926,474
[45] Dec. 16, 1975

[54] VEHICLE SEATS

[75] Inventors: John Paul Johndrow, Stafford; Joseph Pallant, Albrighton, near Wolverhampton, both of England

[73] Assignee: H. R. Turner (Willenhall) Limited, Walsall, England

[22] Filed: Aug. 16, 1974

[21] Appl. No.: 497,906

[30] Foreign Application Priority Data
Aug. 22, 1973 United Kingdom............... 39721/73

[52] U.S. Cl. ............... 297/355; 297/292; 297/367; 297/378; 16/189; 403/111
[51] Int. Cl.² ......................................... A47C 1/025
[58] Field of Search ........... 297/291, 292, 293, 300, 297/354, 355, 363–372, 378, 379; 403/111, 403/120, 146; 16/180, 189; 135/45 A; 248/240.4, 387

[56] References Cited
UNITED STATES PATENTS

| | | |
|---|---|---|
| 3,309,138 | 3/1967 | Byczkowski et al. ............... 297/355 |
| 3,641,838 | 2/1972 | Turner ............................ 297/369 X |
| 3,663,056 | 5/1972 | Turner .............................. 297/369 |
| 3,822,914 | 7/1974 | Iida et al. ...................... 297/379 X |
| 3,840,268 | 10/1974 | Johndrow et al. ................. 297/366 |

*Primary Examiner*—Marion Parsons, Jr.
*Assistant Examiner*—William E. Lyddane
*Attorney, Agent, or Firm*—Marshall & Yeasting

[57] ABSTRACT

A motor vehicle seat having a seat base and a backrest hingedly connected to the seat base, also incorporates a selectively-operable reclining mechanism whereby the angular position of the backrest may be adjusted relative to the seat base according to the occupants' requirements. To aid control over the backrest during adjustment, a scroll spring encircling the hinge axis has its ends in abutment with projections provided on the seat base and backrest respectively and is arranged to disengage from one of the projections when the backrest is pivoted forwardly beyond certain seating positions, to disable the spring action during movement of the backrest beyond such positions.

4 Claims, 3 Drawing Figures

VEHICLE SEATS

BACKGROUND OF THE INVENTION

This invention relates to vehicle seats of the kind including a seat base part, a backrest part hingedly connected to the seat base part and a mechanism for releasably retaining the backrest part in selected angular positions with respect to the seat base part.

In a known vehicle seat of the kind referred to, the retaining mechanism is arranged to be manually operable by the occupant of the seat, and to afford a measure of control over the backrest when released for adjustment, the latter is spring biased towards a neutral, usually vertical position so that the occupant may lean backwards to tilt the backrest to a desired angular setting against the spring bias. In this known vehicle seat, the spring is constituted by a torsion bar, the respective ends of which are fast with the seat base and backrest.

In circumstances where the backrest is required to be hinged forwardly beyond normal seating positions as in, for example, two-door vehicles, the spring bias exerted by the torsion bar resists such movement with a force increasing with the extent of forward hinging.

This problem may be overcome by arranging for the aforesaid neutral position to correspond to the maximum forwardly tilted position of the backrest but this would lead to the backrest being subjected to undesirably large spring bias in normal sitting positions.

SUMMARY OF THE INVENTION

The object of the present invention is to overcome the aforesaid drawbacks.

According to the invention, we provide a vehicle seat of the kind referred to including biasing means for acting between an anchorage provided on one of said parts and an abutment member on the other part to resiliently oppose angular movement therebetween in one sense, the biasing means being disengeable from said abutment member on the other part when said parts are hinged into and beyond a predetermined angular relation in the opposite sense.

Thus, by arranging for the biasing means to disengage from the abutment member when the backrest part is tilted forwardly beyond the range of normal seating positions, the biasing action may be disabled altogether.

The biasing means is preferably in the form of a spring and the spring may be arranged to disengage automatically from the abutment member as the backrest is hinged to and beyond a position in which the spring is unstressed.

Alternatively the spring may be disengaged from the abutment member whilst still stressed and in this case, it is preferred to provide on said one part a further abutment which engages the spring and displaces the same away from the first mentioned abutment when said parts are hinged into and beyond said predetermined angular relation.

Preferably the biasing means comprises a scroll spring encircling the hinge axis and having one of its ends engaged with the anchorage on said one part and its other end in abutment with the abutment member on said other part.

The anchorage on said one part may be constituted by an end portion of a torque tube welded or otherwise secured to said one part and rotatable with respect to the other part to provide the hinging action, said one end of the scroll spring engaging in a slot formed in the torque tube, which slot may open at the end proper of the torque tube to facilitate assembly of the scroll spring to said one part.

DESCRIPION OF THE PREFERRED EMBODIMENT

Figure 1:
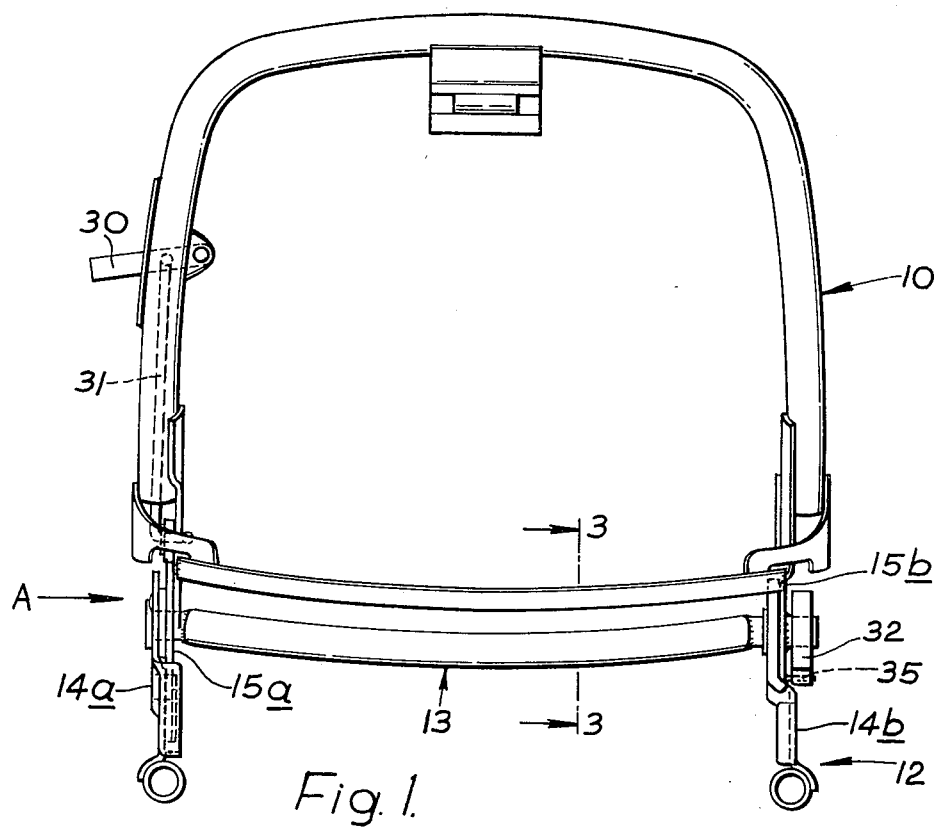
FIG. 1 is a rear elevation of the skeleton framework of a motor vehicle seat.
Figure 3:
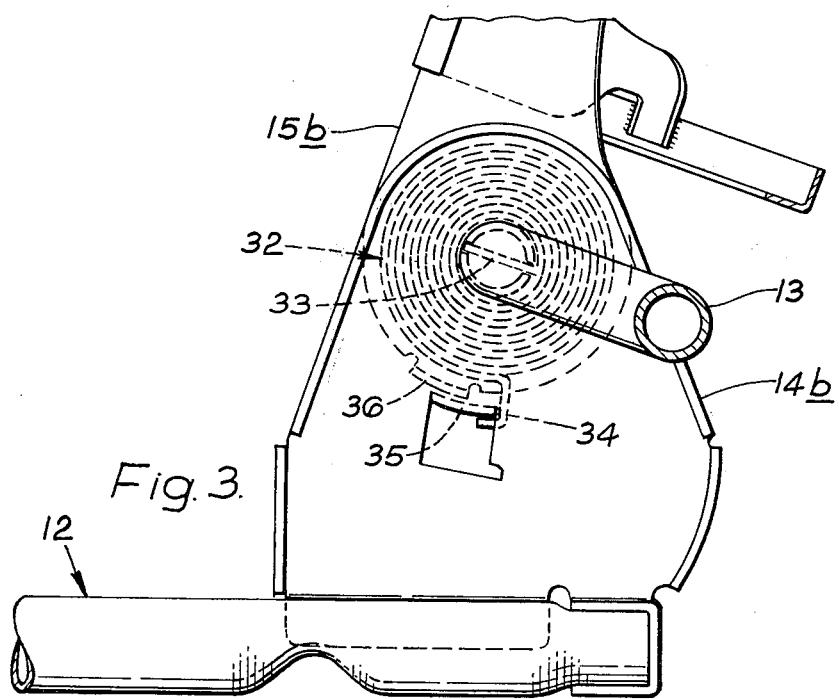
FIG. 3 is an enlarged fragmentary sectional view taken on the line 3—3 in FIG. 1.

As shown in the drawings, the skeletal framework of a motor vehicle seat comprises a backrest frame 10 and a seat base frame 12 which are hingedly coupled by a transversely extending torque tube 13. Upstanding plates 14a and 14b are secured to the rear ends of the base frame 12, and the backrest frame 10 is provided with plates 15a and 15b which are disposed in confronting relation with the plates 14a and 14b respectively. The tube 13 is of arcuate configuration and has the ends thereof co-axially aligned, the ends passing through the respective pairs of plates 14a, 15a, and 14b, 15b. The ends of the tube 13 pass freely through apertures in the plates 14a and 14b but are welded or otherwise secured to the plates 15a and 15b. The aperture 16 in the plate 14a is in the form of a slot extending radially of the associated end of the tube 13.

Figure 2:
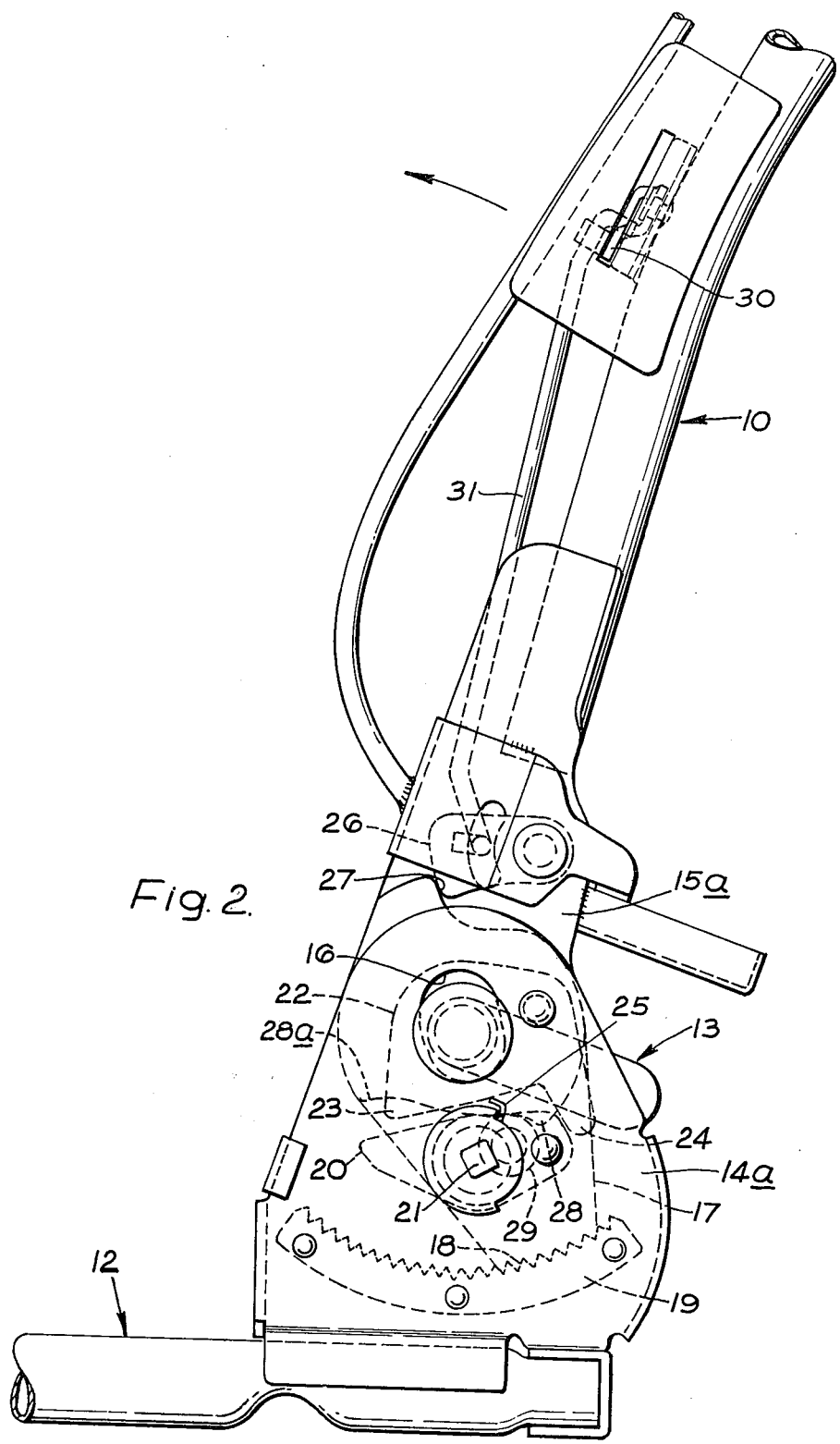
FIG. 2 is an enlarged fragmentary side elevation taken in the direction A in FIG. 1.

Between the plates 14a and 15a, there is provided a locking member 17 forming part of an adjustment mechanism for controlling the inclination of the backrest relative to the seat base. The locking member 17 is freely journalled on the tube 13 and is formed with a set of teeth 18, the pitch circle of which is concentric with the associated end of the tube 13. A set of complementary teeth 19 are provided on the plate 14a for meshing engagement with the teeth 18 on the locking member 17. When the two sets of teeth are in mesh, the locking member 17 and the backrest are held in fixed angular relation relative to the seat base. Adjustment may be effected by displacing the locking member 17 radially away from the teeth 19 to disengage the two sets of teeth and this is achieved by displacing the end of the tube 13 passing through the plates 14a and 15a upwardly along the slot 16 from the position shown in FIG. 2.

For this purpose, the adjustment mechanism includes a cam 20 which is pivotally mounted on the plate 14a between the plate 14a and the locking member 17 and is turnable by means of a lever (not shown mounted on a square end provided on a pin 21 which is fast with the cam 20. A cam follower 22 is journalled on the tube 13 between the plate 14a and the locking member 17 for cooperation with the cam 20, the arrangement being such that when the cam 20 is turned clockwise, as viewed in FIG. 2, it is brought into engagement with lobes 23 and 24 of the cam follower 22 so that further turning of the cam 20 is effective to displace the cam follower 22 and hence the shaft 13 upwardly. Remeshing of the teeth 18 and 19 after adjustment of the backrest is effected by returning the cam 20 in the anti-clockwise sense and a spring 25 is provided which serves to bias the cam 20 in the anti-clockwise sense.

The plate 15a is normally movable angularly with the locking member 17 as a unit during adjustment of the backrest but to allow the backrest to be pivoted forwardly independently of the adjustment mechanism to facilitate access to the rear seats of a two-door vehicle, the place 15a is held angularly captive to the locking member 17 by a releasable latch mechanism comprising a latch member 26 pivoted to the backrest frame. The latch member 26 is cooperable with an abutment face 27 formed on a projecting portion of the locking member 17 to prevent pivoting of the backrest in an anti-clockwise sense relative to the locking member 17 (as viewed in FIG. 2). Pivoting of the backrest in the opposite sense is prevented by abutment between a shoulder formation 28 on the lower edge of the plate 15a and a stop member 29 which is welded or otherwise secured to the locking member 17.

To allow release of the backrest for forward pivoting, the latch member 26 is pivotable upwardly clear of the abutment face 27 by means of a lever 30 which is coupled to the latch member 26 by a rod 31 having a pin and slot connection with the latch member 26. The latch member 26 is conveniently spring biased to the latching position and is shaped so as to rise over the projecting portion of the locking member 17 during return movement of the backrest so as to spring back into engagement with the abutment face 27. Forward pivoting of the backrest relative to the locking member 17 and hence the seat base is limited by abutment between a further shoulder portion 28a provided on the lower edge of the plate 15a and the stop member 29.

In order to afford the occupant of the seat some measure of control over tilting of the backrest during adjustment thereof, on the opposite side of the seat there is provided means for biasing the backrest forwardly so as to resiliently oppose rearward tilting thereof. The biasing means is in the form of a scroll spring 32 encircling the adjacent end of the tube 13 and having the inner free end 33 thereof anchored to the tube by forming the tube with diametrically opposite axial slots through which the free end 33 extends. The outer free end of the spring 32 is turned radially outwardly to form a hook 34 which is arranged to abut an anchorage 35 pressed out on the plate 14b.

The anchorage 35 and the scroll spring 32 are arranged so that the latter is stressed during hinging movement of the backrest (together with the locking member 17) through a normal range of seating positions In this way the scroll spring 32 facilitates control of hinging of the backrest during adjustment thereof.

In order to disable the scroll spring 32 when the backrest is to be pivoted forwardly after release of the latching member 26, the outer free end 34 of the spring is disengageable from the anchorage 35 on the seat base plate 14b. Thus, as the backrest is pivoted forwardly the outer end 34 of the scroll spring disengages from the abutment 35 and consequently the scroll spring is ineffective to resiliently oppose movement of the backrest. To provide for positive displacement of the end 34 of the spring from the anchorage 35, the lower edge of the plate 15b is formed with a tag or lug 36 which is arranged so as to engage the end 34 at a predetermined angular position of the backrest relative to the seat base, which position may be more rearward than the position at which the spring 32 would become unstressed in the absence of the tag or lug 36. It will be understood that the tag or lug 36 may be omitted by arranging for the scroll spring to become unstressed at a position just beyond the range of normal seating position because the free end 34 thereof will automatically disengage from the anchorage 35 when the backrest is tilted beyond such position.

What we claim is:

1. A reclining seat comprising a seat base part, a back rest part, a pivot member which is fixed to one of said parts and is rotatable relative to the other part, and which connects the two parts together, a mechanism operable to releasably retain the back rest part in selected angular position with respect to the base part, and a coil spring encircling the pivot member for biasing the back rest part forwardly relative to the seat base part, said spring having an inner end which is secured to the pivot member that is fixed to one of said parts, and an outer end which bears against an abutment carried by the other part, whereby the spring is increasingly stressed as the back rest part is pivoted rearwardly from an upright position relative to the seat base part, characterized in that a further abutment is provided on the part to which the pivot member is fixed, and is located at a distance from the pivot member corresponding to the spacing between the pivot member and said outer end of the spring, in a position to engage said outer end of the spring during pivoting of the back rest part forward from said upright position, to displace said outer end of the spring out of engagement with the first-mentioned abutment, thereby disabling the biasing action of the spring.

2. A reclining seat according to claim 1 wherein the pivot member comprises a torque tube, extending from side to side of the seat, one end of which has diametrically opposite axial slots in the wall thereof through which the inner end of the coil spring passes.

3. A reclining seat according to claim 1 wherein the outer end of the coil spring extends radially relative to the pivot member, and said further abutment is radially closer to the pivot member than the first-mentioned abutment, both abutments lying within the radial extremities of said outer end of the coil spring.

4. A reclining seat according to claim 1 wherein the pivot member is fixed to the back rest part.

* * * * *